P. MONTSABRE.
TRIPLE RAIL ENDLESS TRACK.
APPLICATION FILED NOV. 26, 1910.
1,149,278.
Patented Aug. 10, 1915.
8 SHEETS—SHEET 2.
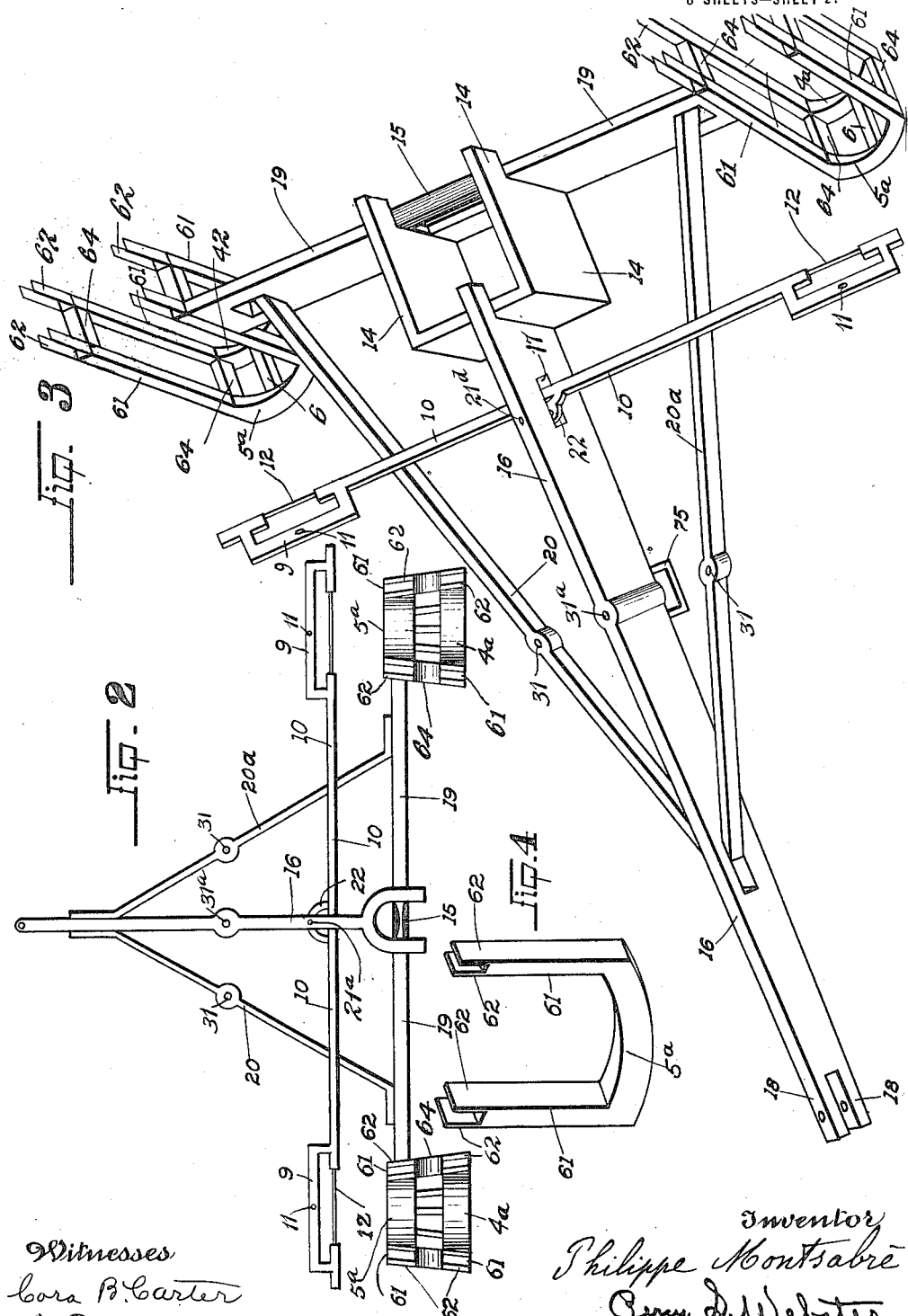

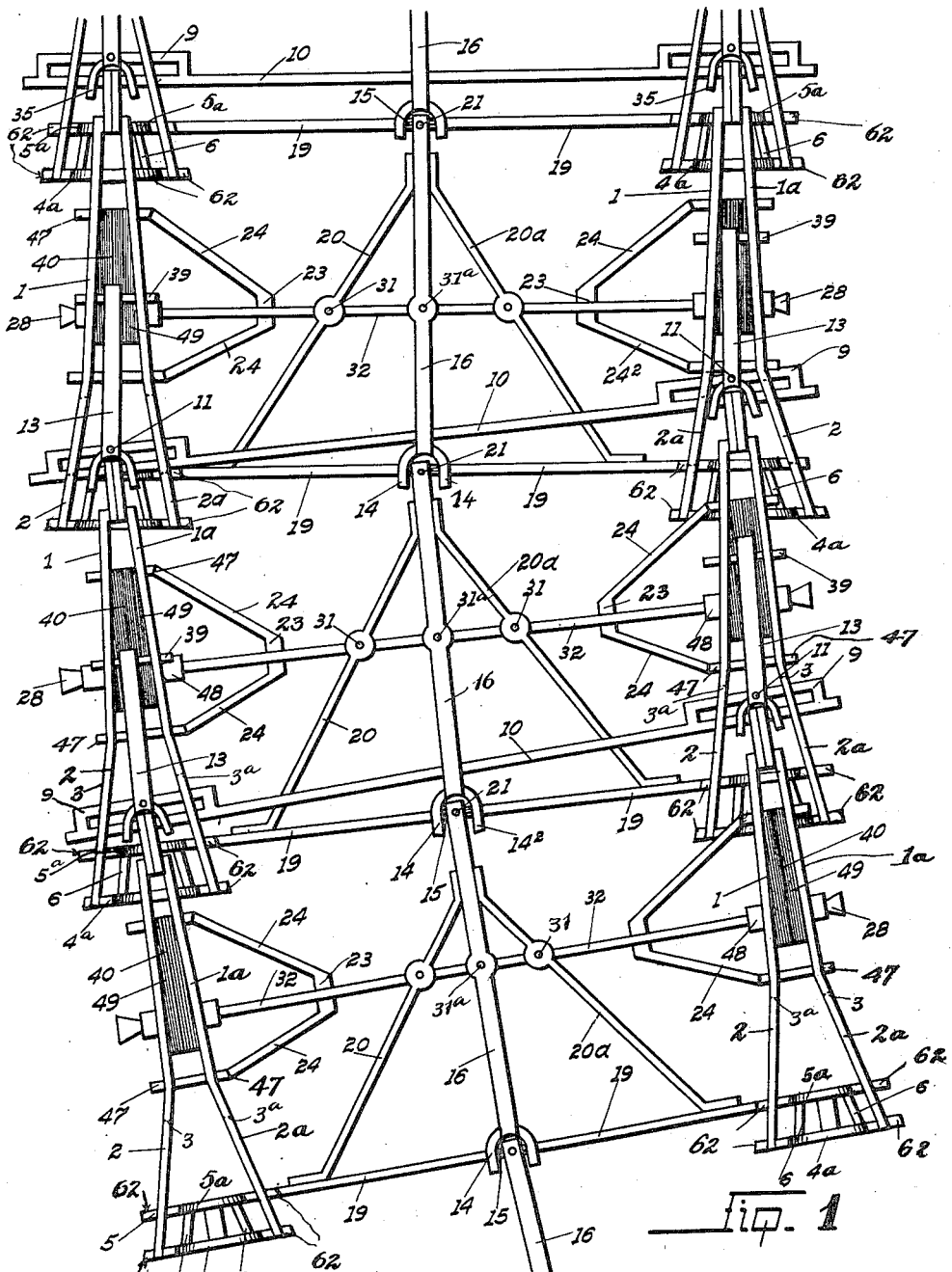

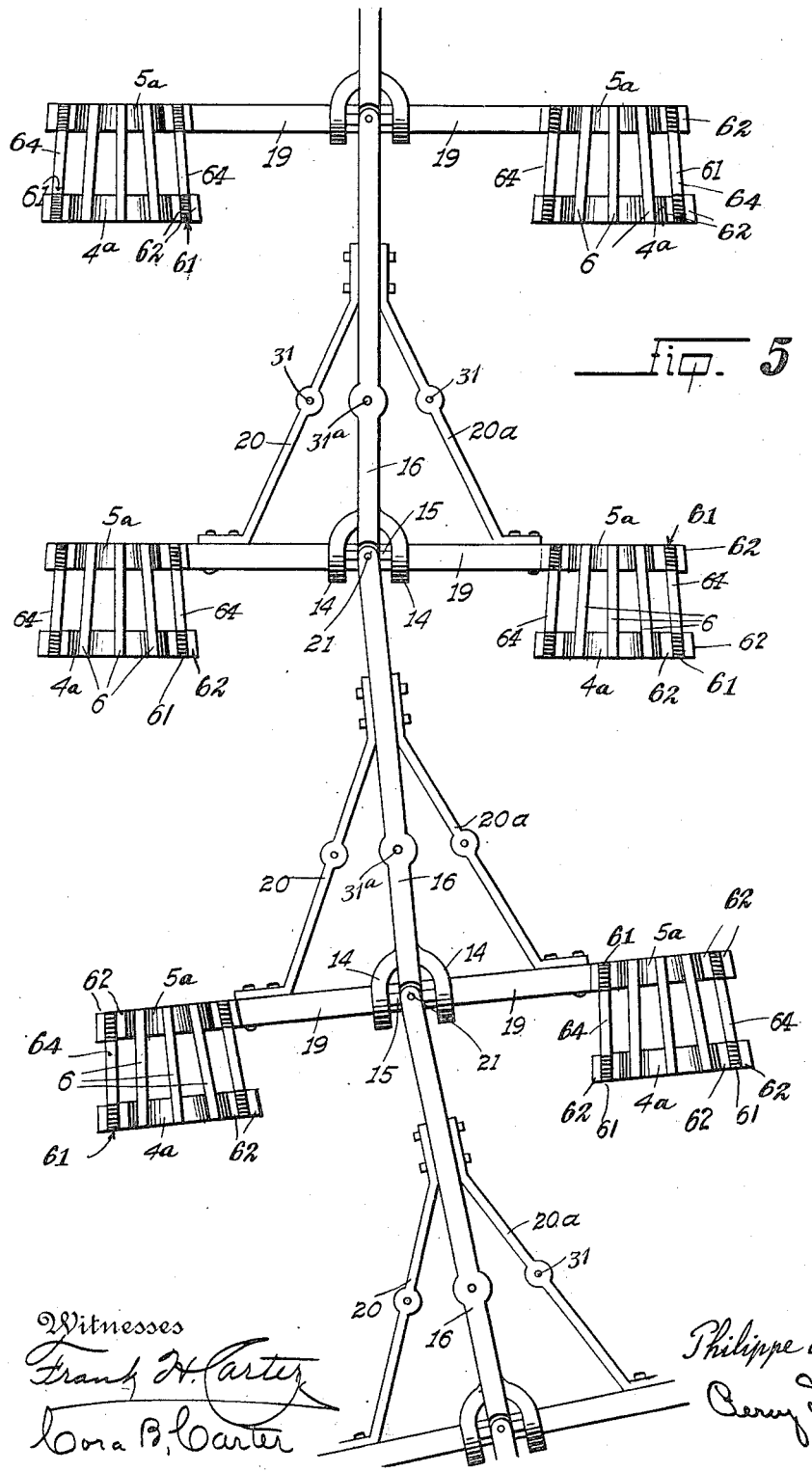

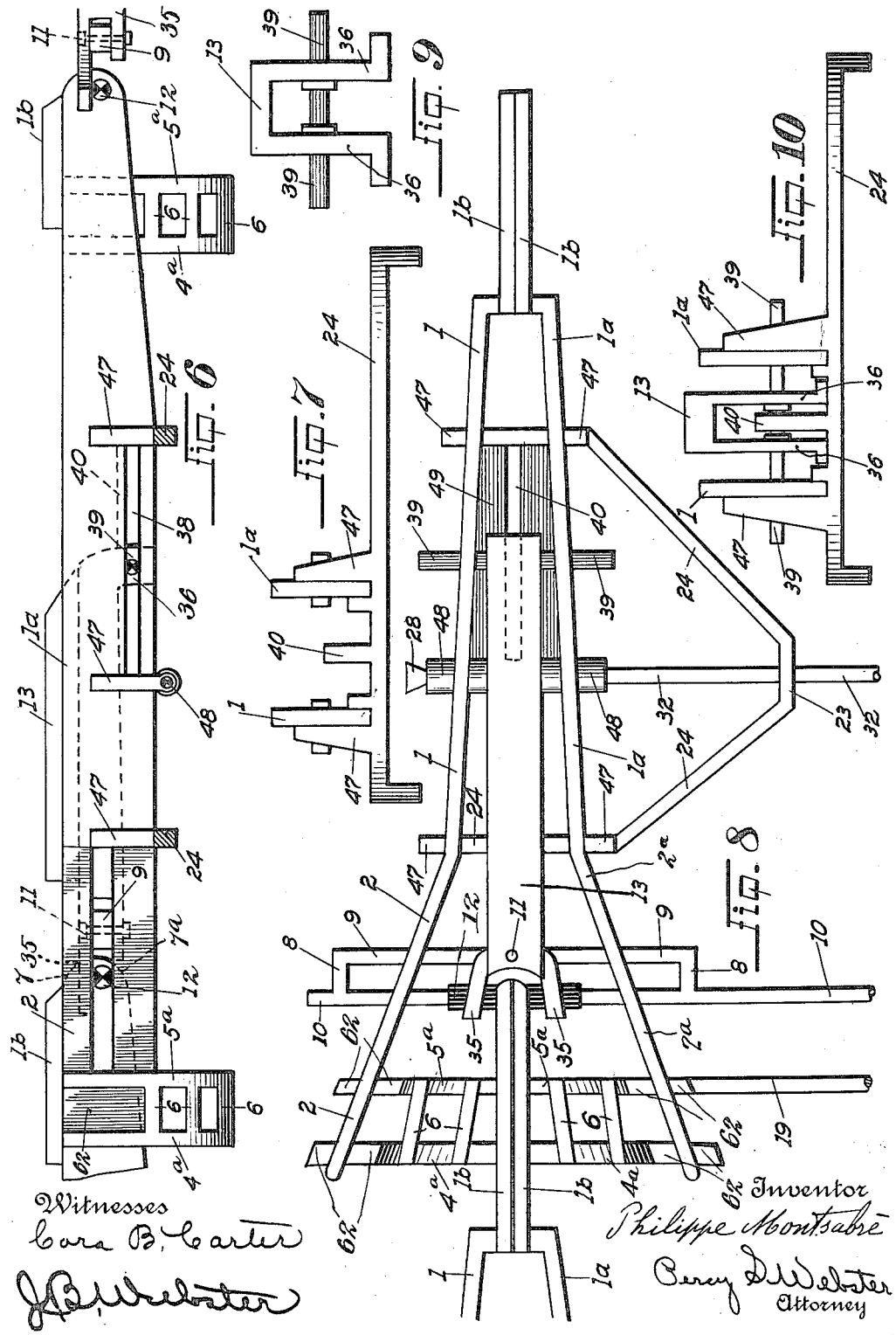

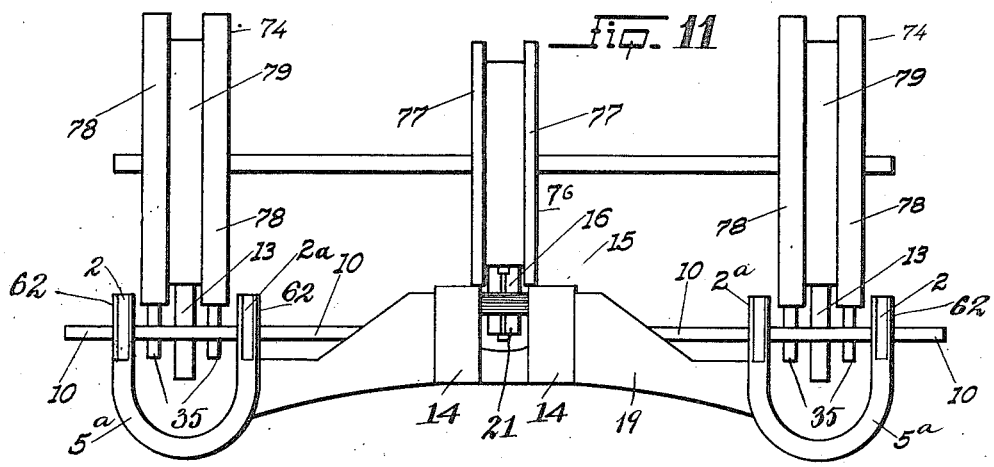
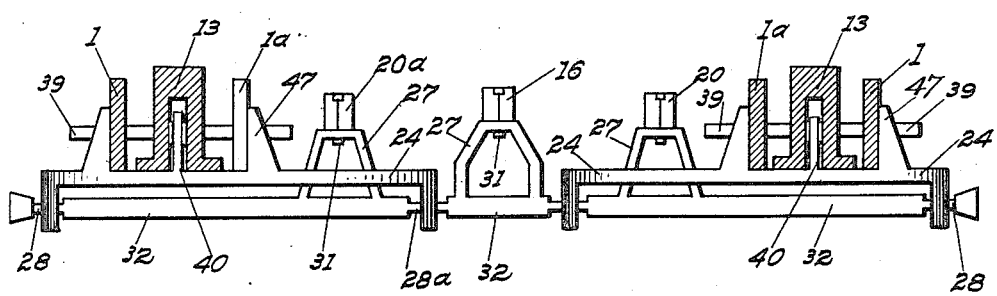
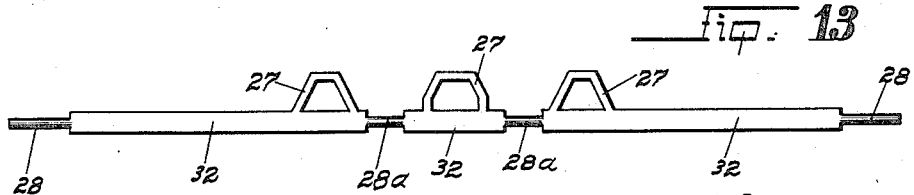
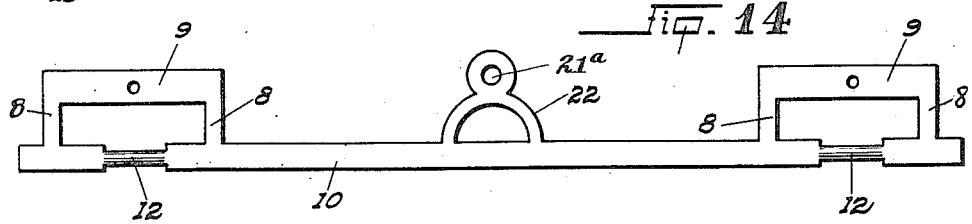

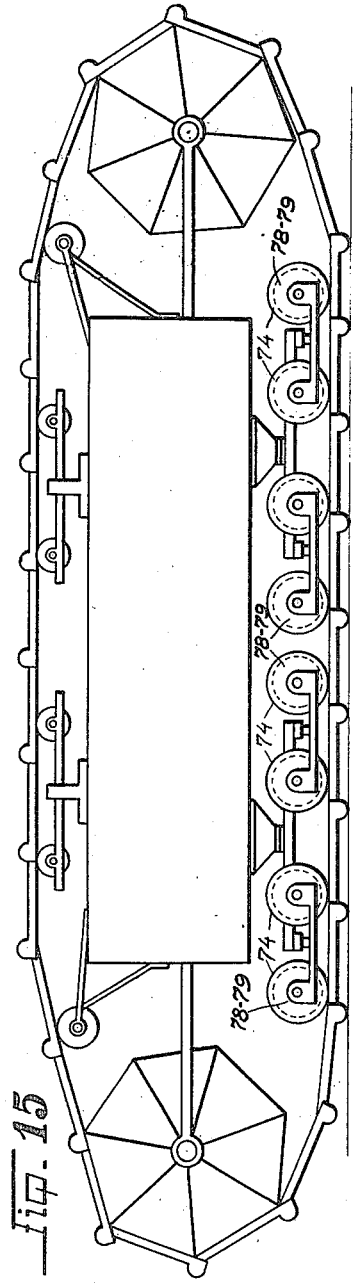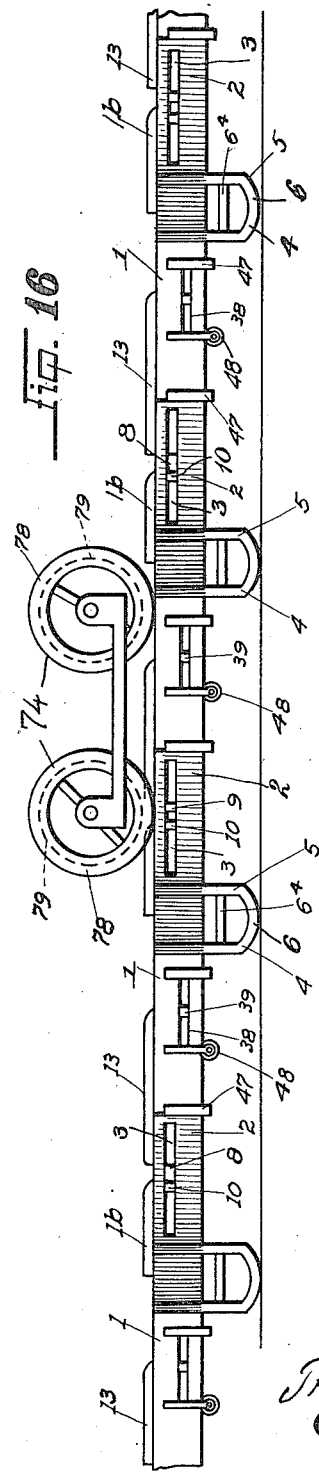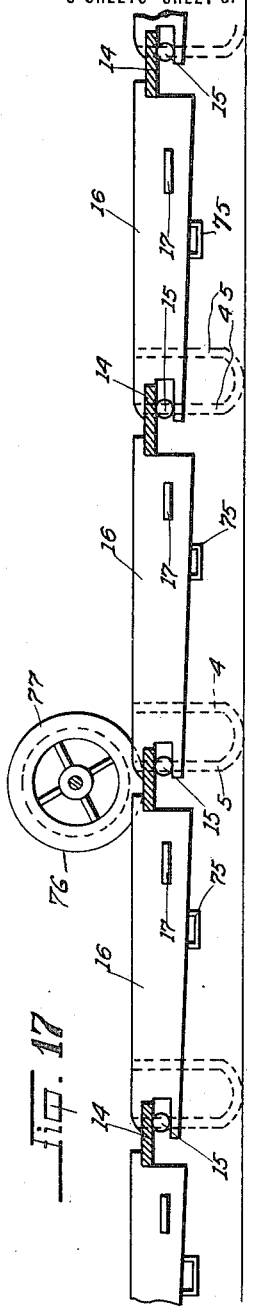

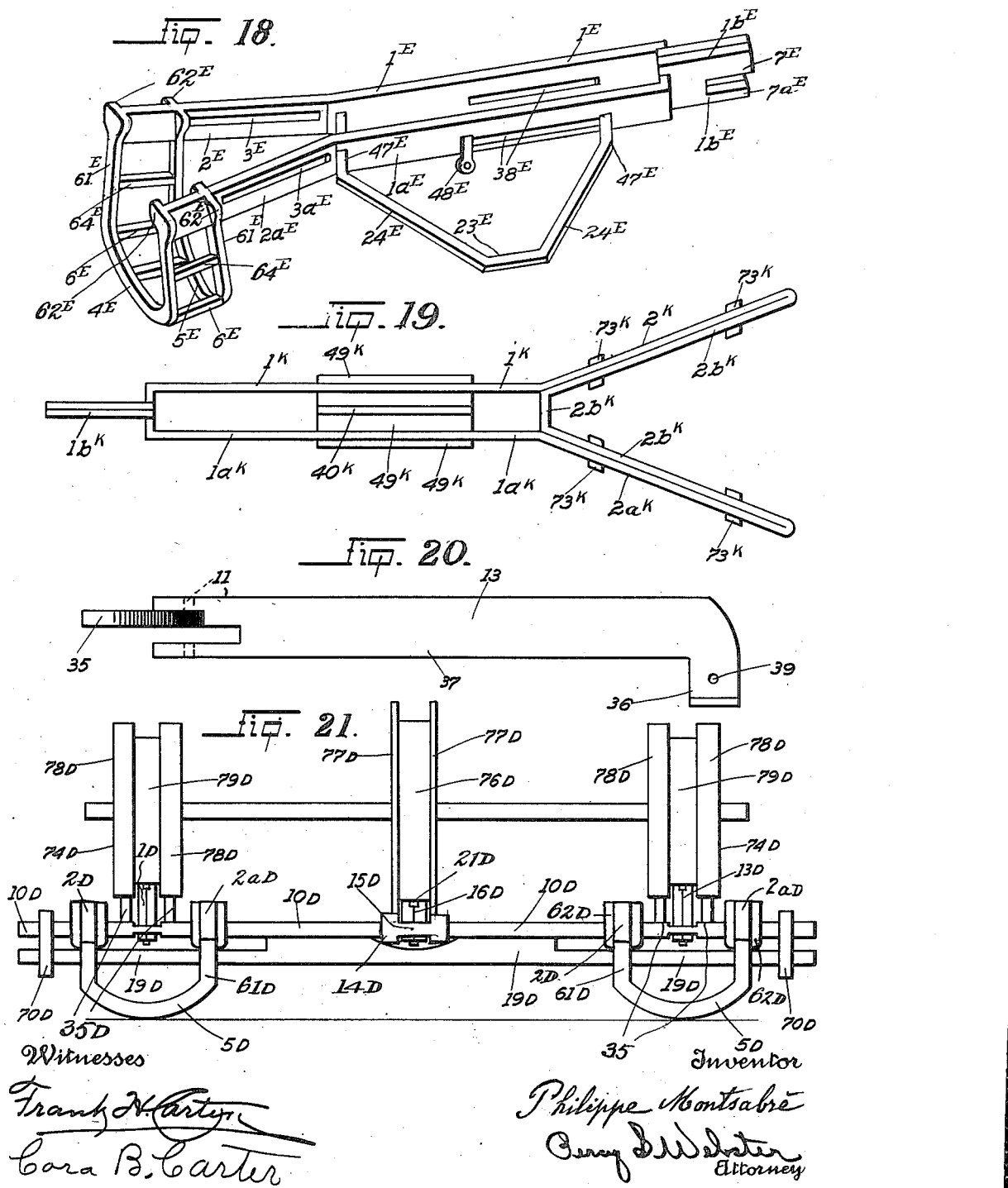

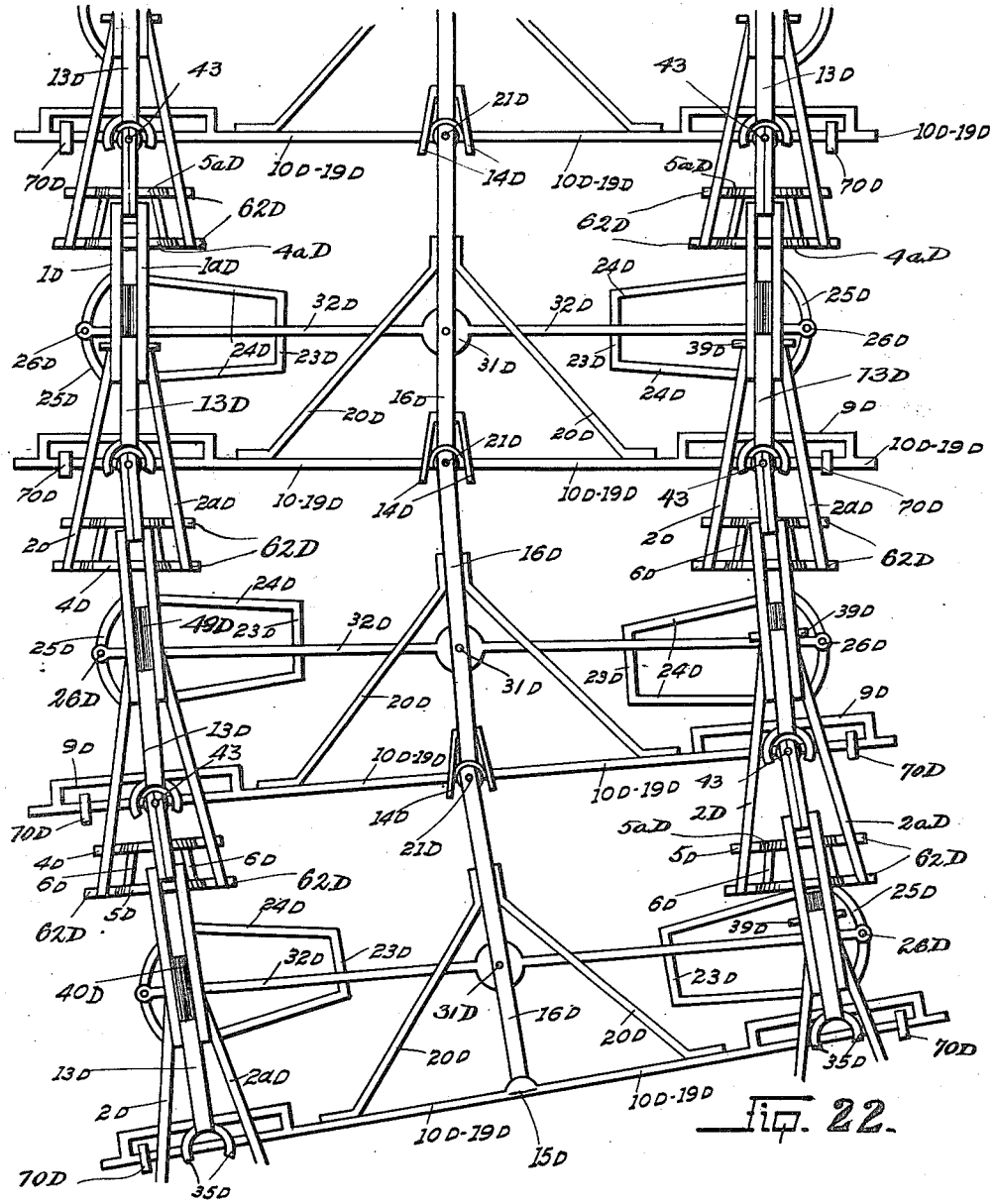

UNITED STATES PATENT OFFICE.

PHILIPPE MONTSABRÉ, OF FRESNO, CALIFORNIA.

TRIPLE-RAIL ENDLESS TRACK.

1,149,278.

Specification of Letters Patent.   Patented Aug. 10, 1915.

Application filed November 26, 1910.   Serial No. 594,266.

*To all whom it may concern:*

Be it known that I, PHILIPPE MONTSABRÉ, a citizen of the United States, residing at Fresno, in the county of Fresno, State of California, have invented certain new and useful Improvements in Triple-Rail Endless Tracks; and I do declare the following to be a full, clear, and exact description of the same, such as will enable others skilled in the art to which it appertains to make and use the same, reference being had to the accompanying drawings, and to the characters of reference marked thereon, which form a part of this application.

My invention relates to improvements in endless track traction devices of the character set forth in Patent No. 865,605, whereby traction engines or other vehicles may lay their own tracks in an endless manner, thus enabling heavy vehicles to travel over soft and uneven surfaces in a rapid and effective manner without danger of being lodged in the same.

Also the invention embodies a structure of the kind herein described whereby the vehicle may move rapidly over the track portions laid on the ground with a less expense of power and energy than is required in the ordinary wheeled vehicles.

The present invention is especially designed as an improvement in the construction or mechanism of a triple rail endless track, the object of the present invention being to produce a simple and practical device for this class of endless track, in which all the parts are properly coöperating with each other, so as to be effectively used as a rigid track although they are constituted of sections flexibly joined.

The particular improvement aimed at in the present application consists of the formation of a new design of triple rail tracks including a new design of Y-shaped rails acting in combination with a shifting rail operating in its center. I also provide in combination with this structure a new means for connecting the oppositely disposed Y-shaped members in a diagonal and transverse manner. The new sliding rail bar mentioned above is a simple structure of a bar which is connected by certain means to said Y-shaped rails and is capable of moving in a reciprocating motion thereon and which necessitates the opposite Y-shaped rails to be connected in a transverse manner above mentioned. This structure embodies one of the essential features of the improvement specified in this application as will fully appear hereafter.

Also the invention includes an improved means of proper connections between the parts of the track proper and the bearing surfaces traction wheels moving or running thereon.

In connection with the above mentioned prominent features of the invention the improvement also embodies certain new and different means for the improvement of the longitudinal and transverse structure of a track section as is necessary to overcome the lateral as well as the longitudinal strain which is encountered when the track sections are placed or moved over bad or uneven roads.

All these objects of my invention, I accomplish by means of such structure and relative arrangement of parts as will appear by a perusal of the following specification and claims.

In the drawings similar characters of reference indicate corresponding parts in the several views.

Figure 1, is a top plan view of a series of my improved triple rail sections pivoted together. Fig. 2, is a detailed top plan view of the construction of the central part of the track, and showing also transverse bars provided with supporting feet on their outer ends. Fig. 3, is a perspective view of the subject matter shown in Fig. 2. Fig. 4, is a perspective view of one section of a supporting foot member. Fig. 5, is a top plan view of a plurality of central supporting rail members pivoted together and showing transverse bars with supporting feet thereon. Fig. 6, is a side elevation of a Y-shaped rail supporting a sliding rail mechanism. Fig. 7, is a transverse view showing certain details in construction of the Y-shaped rails. Fig. 8, is an enlarged top plan view of a Y-shaped rail mounted with a sliding rail. Fig. 9 is an end view of the sliding rail 13. Fig. 10, is a detailed end view of the subject matter shown in Fig. 8. Fig. 11 is an end view of the track section showing a transverse supporting bar connected at its outer ends to supporting feet members. Fig. 12 is a sectional view of the track section at its junction with a transverse bar 32. Fig. 13, is a side elevation of a transverse bar 32. Fig. 14, is a plan view of a transverse joining bar. Fig. 15, is a side elevation of a vehicle mounted on an endless triple rail track. Fig. 16, is a side elevation of a series of consecutively placed Y-shaped rails secured pivotally to one another. Fig. 17, is a side elevation of a series of central rail bars, shown pivoted together. Fig. 18 is a perspective view of a modified form of Y-shaped rail, that may be used in connection with the modified form of track shown in Fig. 22. Fig. 19 is a plan view of another modification of form of the Y-shaped rail. Fig. 20 is a side elevation of a modified form of the sliding rail. Fig. 21 is a perspective transverse-section of the modified form of track shown diagrammatically in Fig. 22. Fig. 22 is a diagrammatic plan view of a modified form of track produced by a change in the relative arrangement of parts, as will appear hereinafter.

As it will be noticed, I have shown herein several modified forms of structures over the preferred form herein described and claimed; hence I will now describe in detail the preferred form and its operation and thereafter describe briefly the modifications employed in the structure shown in these modified forms.

Referring now more particularly to the characters of reference on the drawings and especially to Figs. 1, 2, 3 and 5, it will be noticed that in constructing each of my triple rail track sections, I first provide a central bar 16, and a transverse supporting bar 19, which central bar and transverse supporting bar are secured at right angles to each other. The best manner of joining the same for this track construction is to provide one of the extremities of the central rail bar 16 with a pair of branches 14, disposed in a horizontal plane with relation to the member 16. These branches 14 are secured in an integral manner on the upper side and also on the vertical sides of the transverse supporting bar in order to make a strong and efficient joint and thus compensate for and overcome the great strain to which this part of the track is subjected. A horizontal pivot 15, is arranged between the horizontally disposed branches 14, and is preferably constructed as an integral part of the transverse supporting bar 19, by cutting away such bar sufficiently to form said pivot 15, this structure giving to this part of the mechanism its maximum strength. The free extremities of the consecutively placed central rail bars of the track are mounted pivotally on said horizontal pivot 15, by means of a pair of superposed branch bars 18, which are secured in an integral manner at the free ends of said central bars 16, as seen by Figs. 3 and 17, and a vertical pivot 21 secures said branches 18 on the aforesaid horizontal pivot 15, as seen by Figs. 1 and 11, thus securing the central rail bars 16, together in a flexible manner, permitting them to turn as is desired, all as is shown in Figs. 1, 5 and 11. In order to give a more substantial strength transversely at the junction of the two bar members 16 and 19, I provide a pair of oblique brace bars 20 and 20$^a$ which secure the lateral sides of the central bar 16 to those of the supporting bar 19, maintaining them securely together in a perpendicular manner, as seen in Figs. 1, 2, 3 and 5. It might be well at this point to note that the construction of the part just described, by reason of its simplicity, is a decisive or characteristic feature of this improved structure, and the same will be found unaltered throughout all the modifications in the form of structure shown in several of the drawings. On account of its position in the central part or portion of the track way, the central rail bar 16 is utilized as a central rail member on which are supported and operate or run, central rollers or wheels 76, having flanges 77 on each side, which flanges project below the upper plane of said rail 16, and serve to maintain the truck of the car or vehicle, on the straight or curved portions of the track, as seen by Figs. 11 and 17. To bridge over or compensate for the small separation or space existing between the extremities of the consecutive or adjacent central rail bars 16 of the track, the top surfaces of the horizontal branches 14 are spaced on a lower horizontal plane than the top plane of such central bars 16, and they are so spaced apart in such a position as to be in frictional contact with the peripheries of the flanges 77 in order to support them and incidentally the vehicle when they pass over such intervening space, as shown in Figs. 3 and 17. In this connection it might be well to note that the perspective view shown in Fig. 3 is particularly drawn to show distinctly and accurately the details of construction relating to the union between the bars 16 and 19 and in consequence the branches 14 are spaced well apart, but it will be readily understood that in actual construction their spaced distance would be reduced sufficiently to allow them to coöperate with the flanges 77 as just previously stated and as seen by Figs. 1, 2 and 5. Y-shaped rails comprising a stem portion 1 and 1$^a$ and a branching bifurcated portion 2 and 2$^a$, are spaced on each side of each central rail bar 16 and are maintained at an invariable distance from each other, principally by reason of their being joined to the extremities of the transverse supporting bar 19, and in order to fully understand this structure it becomes necessary at this point to briefly set forth the specific structure at the extremities of such transverse supporting bars 19. These ends of such supporting bars 19 are, broadly speaking, formed into substantial U-shapes, and this particular form of such extremities is to be found in the preferred form of track now to be described as well as in the different modification of the track shown in some of the drawings. In the preferred form of track structure now being described, these U-shaped extremities of the supporting bars 19 have for their purpose to be used as supporting foot members for the track and consequently the lower extremities of the U-shaped members are slightly curved in order to be rapidly adjustable over the irregularities of the road surface over which the same may travel. These U-shaped foot members designated on the drawings, as 4 and 5, are secured to the Y-shaped rails above mentioned in a certain specific manner, namely, from the curved base members proper $4^a$ and $5^a$, integral and oppositely disposed bars 61 project vertically or upwardly on each side of such curved members and serve to hold elevated the track sections above the ground, there being on the top of the vertical bars 61, a pair of parallel and vertical branches 62 which serve to frictionally engage the vertical end of the bifurcated branches 2 and $2^a$, of the Y-shaped rails to which they are secured by any desired securing means known in the art. Generally speaking, two curved bars U-shaped and disposed in a parallel manner are sufficient to form a supporting foot member, and hence these two U-shaped members are joined one to another by means of the brace bars 64 connecting the upper portion of the opposite vertical bars 61 and the opposite curved members $4^a$ and $5^a$ are connected by a series of small braces or connection rods 6, as seen in Figs. 1, 2, 3, 4, 5, 16 and 18. The complete foot members 4 and 5 constructed as specified present an extended surface of contact over the ground and can stand readily over the sandy and soft portions of the road and hence can be readily used in traveling over desert fields and desert lands as well as soft and boggy lands.

I want it to be understood, that I do not limit the invention to the specific description on the way of joining the U frames to the branches of the Y shaped rails, as many variable expedients can readily be imagined for that purpose.

I will now give in detail a description of the Y-shaped side rails above mentioned, which are used in this track construction and which are coöperatively secured by means to the transverse supporting bars 19 of the track.

Referring now to the enlarged details shown in Figs. 6, 7, 8, 9 and 10, it will be noticed that each Y-shaped side rail is made up as set forth, namely, the stem rail portion consisting of two longitudinally extending bar plate members 1 and $1^a$ placed at a small distance from each other, which are flared, bent or otherwise deviated sidewise near the middle of their length to form two distinct branches or bifurcated portions 2 and $2^a$ and it is mentioned at this time that although these members are made of the same bars, still they have to be distinguished from each other as they have different purposes to perform, and for convenience in the description they are called herewith 1 and $1^a$ of the Y-shaped rails and 2 and $2^a$ designating the bifurcated branches of such stem or rail 1 or $1^a$. The forward portion of the Y-shaped rails consisting of the double rail portion 1 and $1^a$ has for its object to be used as a side rail member. This double rail portion 1 and $1^a$ has its opposite longitudinal sides placed at some distance from each other and they are disposed slightly obliquely with relation to each other in the preferred form of track shown by Figs. 1 and 8, but parallelly disposed in the modifications shown in Figs. 18; 19; 22. The oblique position of the double rails 1 and $1^a$ toward each other has for its object to allow the pivoted extremity of the sliding rail to be deviated laterally by the action of a transverse joining bar 10 when the track sections are laid to suit curvatures as it will appear hereinafter. The double rail 1 and $1^a$, has for its main object to engage a sliding rail 13, which is sustained and operates between the opposite vertical sides of the members 1 and $1^a$, as will be more fully referred to hereinafter. The free end extremities of the double rail portion 1 and $1^a$, come together in a parallel manner to reduce the rail in size transversely and said meeting forms the commencement at which said double rail members commence to spread apart from each other. The diminution in the transverse size of the free end extremities of the double rails 1 and $1^a$, has for its object to permit of its being mounted pivotally on a transverse joining bar 10 hereinafter referred to and to adjust it between the branches 35 of the sliding rail 13 which meet at that same point, as seen by Figs. 1 and 8. Furthermore, the reduced free end extremities of each Y-shaped rail is divided into two branches 7 and $7^a$, as seen by Figs. 6 and 18, which are spaced apart one above the other and adapted to engage the horizontal pivots 12, which are near the extremities of the transverse joining bar 10, as shown in Figs. 1, 3, 8 and 14. As seen by Figs. 1, 8 and 18, the bifurcated branches 2 and $2^a$, of the Y-shaped rails are designed to carry the supporting foot members at their free end extremities and are in consequence subject to a great amount of strain, so it might be found advisable to reinforce the single bars 2 and $2^a$, by doubling them alongside of one another, as shown by the numerals $2^{bk}$ in the modified form of Y-shaped rail shown in Fig. 19. These doubled bars are secured to each other by riveting or soldering them together. These bifurcated members 2 and 2ª, of the Y-shaped rails are also provided with a pair of horizontally disposed slot members 3, for the purpose as will be set forth hereinafter, as seen by Figs. 16 and 18.

I will now describe the means by which the Y-shaped rails above specifically described are joined to, and act in coöperation with the other operating parts of a track section.

By referring more particularly to the Figs. 1, 6, 7, 8, 10 and 12, it will be noticed that several bars 24, 24 and 48 are secured on the bottom of the double rail portion 1 and 1ª of each Y-shaped rail. On account of their position, the bars 24 and 48 are called bottom bars. The bottom bars 24 are assembled in pairs and serve for several distinct purposes, while bottom bar 48 is arranged for another purpose. The pair of bars 24 and 24 are secured to the bottom of the Y-shaped rails by one of their extremities, and on these extremities at their point of junction with the bottom of the double rail 1 and 1ª, are erected a pair of ribs 47 and 47, projecting upwardly, which are applied against the vertical sides of the double rail 1 and 1ª, and serve to maintain them vertically and at the same time at the same distance from each other, as they are bolted or soldered or otherwise fastened one to the other in Figs. 6, 7, 8, 10, 12 and 18. These bottom bars 24 and 24 assembled in pairs, project horizontally and diagonally and are directed toward the track center and these other extremities are secured to one another by a small longitudinal top bar 23, which is adjusted in a parallel manner to the length of a track section, as seen by Figs. 1 and 8. This longitudinal top bar 23 is constructed of a double member in order to engage and hold firmly between them a transverse bar 32 which is set across each track section, as shown in Figs. 1, 8 and 12, and which will be hereinafter specifically described.

It is easy to conceive that the specific construction just given can be made in a reversed manner and that the transverse bar 32 be made up of a bar of longitudinally extending branches between which may be held the longitudinal top bar 23, if desired.

For convenience and for the sake of clearness in illustration, the bottom bars 24, ribs 47 and the longitudinal top bar 23 are hereinafter referred to as the lateral extension of the Y-shaped rails.

The oppositely placed Y-shaped rails of a track section, are each provided with the lateral extensions 24—23 which are directed toward the track center and are engaged and secured to a transverse bar 32.

I will now proceed to give a detailed description of the construction of the parts constituting transverse bar 32, its coöperation and function with the lateral extension of the Y-shaped rails assembled in pairs, and its combined action with the supporting bar 19 to maintain the top rail of the three rails constituting a track section, to coöperate in unison with the plane surface at the peripheries of the wheels 74 and 76, supporting the endless track machine.

Referring now more particularly to Figs. 1, 8, 12 and 13, it will be noticed that the transverse bar 32, is constructed of a straight bar provided with three stands or upright frames 27 on its upper surface. These members 27 are arranged to coöperate with the bottom of the oblique brace rods 20 and 20ª, with the bottom of the central rail bar 16, to which members they are secured by vertical bolts or pivots 31 and 31ª respectively, as shown more particularly by Figs 1 and 12. Consequently, these members 27 serve to reach the bottom of the brace rods and central rails in case their bottom is too far apart to be secured to them. At a certain distance from the center of the transverse bar 32 are two equidistant axial members 28ª, the object of which is to engage the double top bar 23 previously described, as seen in Figs. 12 and 13. At the extremities of the transverse bar 32 are also disposed similar axial members 28, which have for their object to engage the circular aperture formed at the bottom of the bar 48, which bar is fastened at the bottom of the Y-shaped rails; also, the free extremities of the axial members 28 have a screw-bolt to prevent the sliding of the axles 28, in the circular aperture of bar 48, as shown in Figs. 1, 2, 8 and 16, this particular mode of construction being so arranged as to provide for the change in the vertical plane of each of the opposite Y-shaped rails when the track sections are laid down for self-adjustment over the inequalities of the road. It is well to state at this time that the specific structure of the transverse bar 32, can readily be modified without impairing its utility and function, as the stands 27, and the axial members 28ª are mere expedients to connect bars 32 to the other parts of a track section, and as will appear by some of the modifications of the form of track illustrated by some of the figures in the drawings hereinafter described. To understand fully the operation and function of the transverse bar 32, it is essential to consider that the opposite Y-shaped rails of each track section are engaged and supported by the U-shaped foot members 4 and 5 secured integrally at the extremities of the transverse supporting bar 19, and that the transverse bar 32 acts in coöperation with it in order to force the opposite Y-shaped rails to stand in the same horizontal plane, so that they may be placed in a proper position to act in coöperation with the peripheries of the opposite wheels on the car or vehicle. Consequently it is for these reasons that the transverse bar 32 is secured to the bottom of the brace rods 20 and 20ª, to the bottom of the central rail bar 16, and acts on the lateral extension 48, 23 and 24, and that it engages the aperture bar secured at the bottom of the opposite Y-shaped rails, as shown in Figs 1, 8 and 12. This structure shows also that the whole track section is arranged to be projected transversely when it is desired to turn the track to the right or to the left.

As will be noted, I have previously stated that the sliding rail 13, is supported by each Y-shaped rail and is arranged to be slidable between the vertical sides 1 and 1ª, in order to give a square stability to the sliding rail 13 and to assure its steadiness of bearing under the wheels of the car or vehicle. This rail is supported by its extremities only, as seen by Fig. 20, and it is for that purpose also that the intermediate bottom 37 of that rail 13 is arranged upwardly so as not to touch the parts of the mechanism situated below it. The arrangement which is necessary to support the sliding extremity of the sliding rail 13, consists in securing a bar plate member 49 to the bottom of the double rail 1 and 1ª, and from the center of that bar plate member 49 projects upwardly, an integral and central slotted bar member 40, for purposes which will be presently explained, and as shown by Figs. 1, 6, 8, 9, 10, 19 and 20. One of the extremities of the sliding rail 13 is made up like a prop 36 by which it stands and is supported by the bar plate member 49, above described. Also the prop 36 is divided transversely into two side portions, as shown by Figs. 9, 10, 12, which serves to engage between them the slotted central bar 40, above mentioned in order to maintain constantly this sliding rail extremity in the center of the Y-shaped rails. To prevent the slidable extremity of the sliding rail 13 from leaving its sliding place mechanism, I provide a transverse retaining bar 39 which is arranged slidably on the rail portion 1 and 1ª. This transverse retaining bar 39 is arranged to engage and to slide in a pair of horizontal double slot members 38 disposed near the bottom of the forward portion of the Y-shaped rails as seen in Figs. 1, 6, 8, 10, 12 and 16, and it engages also the central slotted bar 40, as seen by Figs. 6 and 10. I want it to be understood that I do not limit my invention to the specific mode of preventing the end of the sliding rail from leaving its place when the track is lifted over-head to turn around the machine, as many substitute means can readily be devised to that end. The other extremity of the sliding rail consists of a pair of branches 35 disposed in a horizontal plane, as shown by Figs. 1, 6, 8 and 20, which are supported by a horizontal bar 9, forming a part of the extremities of a third transverse bar 10, hereinafter referred to. A vertical pivot 11 at the extremity and between the branches 35 of the sliding rail secures the same on the third transverse bar 10.

To coöperate with the side wheels 74 of the car or vehicle, as seen in Figs. 15 and 16, the pair of branches 35, of the sliding rail 13, have their top surfaces situated a little below the top surface of the sliding rail 13, to act and coöperate together in the following manner, namely: The side wheels 74 of the car or vehicle which run on the side rails of the track which are formed by the sliding rail 13 and by the double rail 1 and 1ª, of the Y-shaped rails, have a central groove channel 79 and projecting flanges 78 on each of their sides. The side wheel flanges 78 are designed to be supported by the pair of branches 35, of the sliding rail 13 and by the longitudinal double rail 1 and 1ª of the Y-shaped rails, but the central and grooved channels 79 of these side wheels are designed to be supported by the top of the sliding rail 13 and by the reduced end 1ᵇ of the Y-shaped rails, and is fully illustrated by Figs. 6, 15 and 16, thus presenting an even track way for the side wheels 74, to operate on.

The sliding rail 13, which has just been described has for its main object to provide for the elongation and diminution in length of the side rails when the track is adjusted to turn to the right or to the left.

I have previously stated, that each Y-shaped rail is provided with what I call the bifurcated branches 2 and 2ª, these bifurcated branches being made from a prolongation of the double rail 1 and 1ª, which has been flared or deviated outwardly. Longitudinally extending slot members 3 are in the sides of the bifurcated branches 2 and 2ª, of the Y-shaped rails, as shown by Figs. 6 and 16, and they have for their object to support and engage the spatula ends of a third transverse bar 10, designated herein as a joining bar, and as shown by Figs. 1, 2, 3, 8, 11 and 14, this bar is flat and square shaped at its contact in points with the slotted members 3, to ease its movement therein. At this point it is essential to take note that the transverse bar 10, transverse bar 32, and transverse supporting bar 19 are all acting in coöperation together for the purpose of keeping the opposite Y-shaped rails in the same horizontal plane, the transverse solidity of each track section being of paramount importance in this structure. The transverse joining bar 10, has for its objects to secure pivotally the corresponding extremities of the reduced ends 1ᵇ of the Y-shaped rails assembled in pairs, and the bifurcated branches 35 of the sliding rail 13.

Referring now more particularly to Figs. 1, 2, 3, 11 and 14, it can be noticed that the transverse joining bar 10, consists of a longitudinal bar which is spatula like as to its extremities; and each of its ends are divided into two parts which differ in shape and purpose. One part is shaped to form a horizontal pivot 12 as seen by Figs. 3, 6, 8 and 14, and the opposite pivots 12 on that bar 10, have for their object to be engaged rotatably by the free end extremity of the superposed branches 7 of the Y-shaped rails, assembled in pairs, as seen by Figs. 1, 6, 8 and 18. The other part or portion 9, at the extremities of each transverse joining bar 10, are square shaped and their middle portions are provided with vertical apertures for the purpose presently set forth, and have for their object to support the bifurcated ends 35 of the sliding rail 13, and a vertical pivot 11, around which the sliding rail is transversely pivotable and which engages the vertical aperture previously described, secures them to one another, as seen by Figs. 2, 3, 6 and 8. The center of transverse joining bar 10, is also provided with a semi-circular ring member 22, the top of which is provided with a vertical aperture in which passes vertical pivot $21^a$, to secure it oscillatably on the central rail bar 16 of a track section, as seen by Figs. 2, 3, and 14, for the purpose to project sidewise in an efficient manner the extremities of the Y-shaped rails, assembled in pairs, when the track sections are arranged to follow curvatures. In the preferred form of structure illustrated in Figs. 2 and 3, the transverse joining bar 10, passes through a slot 17 spaced in the sides of the central rail bar 16 in a backward position with respect to the transverse supporting bar 19 to coöperate with the movement imparted to the reduced end of the Y-shaped rails when the track sections are rotating on the central and vertical pivot 21 when the track section is projected transversely for turning, but in the modified form of track shown by Figs. 21 and 22, transverse joining bar center is secured pivotally to the central pivot $21^a$ of the track section as shown in Figs. 21 and 22. Having described hereinabove the preferred form of structure shown in the figures of the drawing referred to above, I will now proceed to describe the small modifications in form which may be applied to this track section if desired.

Considering now the modified form of a track section, shown in Figs. 21 and 22, it can be noticed that the mechanism is arranged differently to operate the transverse displacement or side turning of a track section. It can be readily noticed that this modification in the form of structure, results directly from the reduced end extremities of the Y-shaped rails arranged to pivot around a vertical pivot 43 engaging the horizontal pivots which are at the spatula ends of transverse joining bar $10^D$, as seen by Fig. 22. The Y-shaped rails are thus arranged oscillatably and move transversely in unison with the transverse movement of central rail bar $16^D$, on account of their being pivoted on the same transverse joining bar $10^D$. The pivoting around a vertical pivot 43 of the reduced ends of the Y-shaped rails, produce the following modification in the other parts of the structure: The transverse supporting bar $19^D$ is placed directly under the transverse joining bar $10^D$, as seen by Fig. 21, and completely supported at its middle as well as at its extremities by said transverse joining bar $10^D$. The extremities of the supporting bar $19^D$ pass under the bifurcated branches of each Y-shaped rail and are secured by any means known in the art at the opposite extremities of the transverse joining bar $10^D$, and on account of their reciprocal union, they move completely in unison. Also, the opposite top bars $23^D$ of the lateral extensions, are mounted in an oscillating manner, in the longitudinal extremities of the transverse bar $32^D$. To fully understand the mechanism of this track section, it is necessary to notice, that the transverse bar $32^D$, is not secured to the top bar $23^D$, and is neither secured to the brace rods $20^D$, as it is shown for the preferred form of track, but the center of transverse bar $32^D$ is oscillatable on a vertical pivot $31^D$ which is secured on central rail bar $16^D$, and the extremities of transverse bar $32^D$ which pass loosely under the bottom of the Y-shaped rails are secured pivotally on the opposite pivots $26^D$ mounted on a curved bar $25^D$. The other parts of the track used in this modification just described, being similar to the preferred construction hereinbefore described, I will not make further description here, but refer to the description of the same heretofore given.

Before finishing the description of this machine, it is useful to consider that the transverse solidity and unity of parts used in the construction of each of the sections of the triple rail track are due to the three transverse bars of a track section, namely, the extremities of the transverse-joining bar 10 engaging the double slots 3 of each Y-shaped rail and acting in combination and for the same purpose together, with the transverse supporting bar 19 engaging the bifurcated branches of the Y-shaped rails and which is also acting in combination for the same purpose with the third transverse bar 32, which engages the lateral extensions of the Y-shaped rails and form a track section in which the transverse solidity is not hindered by the transverse flexibility.

In operation the triple rail track mechanism will operate as follows when it is desired to turn to the right or to the left. The central rail bar 16 is projected sidewise by any suitable means carried on the car or vehicle. This action will project transversely the supporting bar 19 which is secured to the member 16 at right angles, thus carrying with it the whole track section as seen by Fig. 1, and at the same time the transverse joining bar 10 of the next track section has its extremities moving in the longitudinal slots of the Y-shaped rails carrying with them the opposite sliding rails 13 and providing an augmentation in the length of the rails situated on the outside curvature and a diminution in length of the Y-shaped rails situated on the inside curvature.

The modified triple rail track section shown by Fig. 22, operates differently from the above, when projected transversely as its parts are pivoted differently, and it can be seen that when the central rail bar 16$^D$, is driven transversely by means carried on the cars, it will project transversely the supporting bar 19$^D$, and the joining bar 10$^D$, which are secured together and are slidably engaged in the branches of the Y-shaped rails, the transverse bar 32$^D$ being secured to central rail bars 16$^D$, by the vertical pivot 31$^D$, and its extremities being also pivoted around the pivot 26$^D$; this transverse bar 32$^D$ will carry sidewise the pair of Y-shaped rails to which it is secured, when central rail bar 16$^D$ is projected transversely, and the sliding rails 13$^D$ and 13$^D$ secured to the transverse joining bar 10$^D$ reduce the augmentation or diminution in length in the track section, which is necessary to follow the curvatures of the roads as shown in Figs. 22 and 21.

Fig. 18 is a modified view of a Y-shaped rail showing the members 1$^e$ and 1$^{ae}$ being parallel instead of obliquely disposed as are the members 1 and 1$^a$ in the preferred form. It is also very important to remark that an independent foot member 4$^E$; 6$^E$ is secured at the bifurcated end of this modified form of Y-shaped rail, producing a great difference in construction from what is shown in the preferred form, but the other parts of that rail are similar in their construction to the preferred form. Fig. 19 is also another modified view in which is shown the branching members 2$^k$ and 2$^{ak}$ which are provided with reinforcements 2$^{bk}$ formed by bending said mmebers 2$^k$ and 2$^{ak}$ back upon themselves in a parallel manner as shown in said Fig. 19. The members 1$^k$ and 1$^{ak}$ are also parallel in this Fig. 19 but the remaining parts of the structure are the same as shown in the preferred form.

From the foregoing description it will readily appear that I have produced such a device as substantially fulfils the objects as set forth herein.

While this specification sets forth in detail the present and preferred construction of the device, still in practice such deviation from such detail may be resorted to as does not form a departure from the spirit of the invention.

Having thus described my invention, what I claim as new and useful and desire to secure by Letters Patent is:

1. A triple rail endless track comprising the combination of a central rail bar, a transverse supporting bar secured at right angles thereto, diagonal brace rods for said bars, a side rail, one on each side of said central rail bar, each of said side rails comprising a Y-shaped rail portion and a sliding rail portion, said Y-shaped rail portion comprising, two bar plate rails, a bottom plate carried by said two bar plate rails, a central slotted bar on said bottom plate, said sliding rail portion, comprising, a body rail 13, acting coöperatively between said double rail bars 1 and 1$^a$ of said Y-shaped rails, a prop 36 at one of the extremities of said sliding rail, a retaining transverse bar 39 carried by said prop, said prop coöperating with said bottom plate 49, said retaining bar 39 coöperating with said slotted central bar 40.

2. A triple rail endless track comprising the combination of a central rail bar, a transverse supporting bar secured at right angles thereto, diagonal brace rods for said bars, side rails, one on each side of said central rail bar, each of said side rails comprising, a Y-shaped rail portion and a sliding-rail portion, said Y-shaped rail portion comprising, a double rail bar, a bottom plate secured between said double rail bar, a central slotted bar for said bottom plate, a reduced end at one extremity of said double rail bar, a sliding-rail engaged slidingly between said double-rail, a prop at one extremity of said sliding-rail, a retaining bar secured on the prop of the sliding rail, a slotted bar secured on the bottom plate of said Y-shaped rails, said props and retaining bar of the sliding-rail coöperating with said slotted bar and bottom plate, a pair of bifurcated branches 2 and 2$^a$, at one end of said Y-shaped rails assembled in pairs, a pair of longitudinal slots 3 and 3$^a$ in said bifurcated branches, a transverse joining bar 10 engaging said longitudinal slots 3 and 3$^a$, a pair of horizontal branches 35 at the other end of said sliding-rail.

3. A triple rail endless track comprising the combination of a central rail bar and a transverse supporting bar 19 secured perpendicularly on each other, brace rods for said bars, Y-shaped rails one on each side of said central rail bar, said Y-shaped rails comprising a double rail bar 1 and 1$^a$, bottom plate, central slotted bar, a pair of longitudinal slots 38 at the bottom of said double rail bar 1 and 1ª, a sliding-rail 13 coöperating with said Y-shaped rails, said sliding-rail comprising, a prop, a transverse retaining bar engaging said slotted bar and said longitudinal slots 38 of said double rail bar 1 and 1ª, bifurcated branches 2 and 2ª at one end of said Y-shaped rails, assembled in pairs, a pair of longitudinal slots in said bifurcated branches, a transverse joining bar engaging said longitudinal slots, a pair of horizontal branches 35 at the other extremity of said sliding rail, means for pivoting the consecutive extremities of said central rail bar, those of the Y-shaped rail portion, and those of the sliding rail, a supporting foot member secured across the end of the bifurcated branches of each of said Y-shaped rails, said transverse supporting bar 19 acting in coöperation with and passing under the bifurcated branches of said Y-shaped rails, assembled in pairs, means for securing transversely the oppositely placed Y-shaped rails, and said brace rods, substantially as shown and described.

4. A device of the character described comprising rail sections flexibly connected with one another, each section including, a central rail bar a transverse supporting bar secured perpendicularly thereto, diagonal brace rods 20 and 20ª securing said central rail bar to said supporting bar, Y-shaped rails one on each side of said central rail bar, lateral and horizontally directed extension bars carried by said Y-shaped rails, an apertured bottom bar 48 at the bottom of said Y-shaped rails, a transverse bar 32 engaging said lateral and horizontally directed extension bars and said apertured bottom bar 48, carried by said Y-shaped rails assembled in pairs, stands 27 secured on top of said transverse bar 32, vertical bolts 31 securing said stands on said diagonal brace rods 20 and 20ª.

5. A device of the character described comprising rail sections flexibly connected with one another, each section including, a central rail bar 16, a transverse supporting bar secured at right angles thereto, diagonal brace rods for said bars, Y-shaped rails, one on each side of said central rail bar, lateral extension bars projecting from said opposite Y-shaped rails and directed toward the track center, an apertured bottom bar 48 between said extension bars, a transverse bar 32 engaging said apertured bar and said lateral extension bars, stands on top of transverse bar 32, vertical bolts securing said stands on said diagonal brace rods, vertical pivot 31 connecting central rail bar 16 to transverse bar 32, longitudinal slots in the bifurcated branches of said Y-shaped rails, a transverse joining bar engaging said longitudinal slots, a spatula member at the ends of said transverse joining bar, a sliding rail movable longitudinally on the rail portion of said Y-shaped rails, a pair of branches 35 at one extremity of said sliding rail, vertical pivot 11 securing said pair of branches 35 on the spatula end of said transverse joining bar 10, a reduced end at one extremity of said Y-shaped rail, said reduced end of said Y-shaped rail mounted rotatably on the spatula end of said transverse joining bar.

6. A device of the character described comprising rail sections flexibly connected with one another, each section including, a central rail secured at right angles to a transverse supporting bar 19, diagonal brace rods for said bars, a Y-shaped rail on each side of said central rail, each Y-shaped rail comprising, a double rail bar, lateral extension bars, an apertured bottom bar, a transverse bar 32 carrying stands on its top engaging said lateral extension bars and said apertured bar, said stands secured to said brace rods and said central rail, longitudinal slots in the bifurcated branches of said Y-shaped rails, a transverse joining bar engaging said slots, a spatula member at the extremities of said transverse joining bar, a sliding rail movable longitudinally on said Y-shaped rails, a pair of horizontal branches at one end of said sliding rail engaging the spatula end of said transverse joining bar, a vertical pivot 11 securing said branch on said joining bar, the reduced ends of said Y-shaped rails assembled in pairs mounted rotatably on the spatula extremities of said transverse joining bar, a supporting foot member U-shaped secured transversely to the opposite branches 2 and 2ª of each Y-shaped rail, said transverse supporting bar 19 secured to the opposite bifurcated branches 2 and 2ª of said Y-shaped rails, a horizontal pivot 15 at the junction of said central rail 16 and said transverse supporting bar 19, the free end extremities of said central rail 16 of the next section mounted rotatably on said horizontal pivot, a vertical pivot 21 securing said central rail on said horizontal pivot, substantially as shown and described.

7. An apparatus of the character described comprising a central rail bar having horizontal branches at one end, a transverse supporting bar secured at right angles on said central rail bar by means of said branches, a horizontal pivot between said branches, oblique brace rods, side-rails, one on each side of said central rail bar, said side-rails comprising, a Y-shaped rail portion and a sliding rail portion, said Y-shaped rail portion comprising, a double rail bar each, a reduced end for said double rail bar, a pair of bottom bars 24 projecting from the bottom of said double rail bar, each bar 24 being slightly inclined with respect to the other and directed toward the track center, a top bar 23 securing the opposite bars 24 to each other, a pair of vertical ribs 47 on top of each bottom bar 24, said ribs 47 coöperating with the external sides of each double rail bar.

8. An apparatus of the character described comprising, a central rail bar having horizontal branches at one end, a transverse supporting bar secured at right angles on said central rail bar by means of said horizontal branches, a horizontal pivot between said branches, oblique brace rods for said bars, side-rails, one on each side of said central rail-bar, said side-rails comprising, a sliding rail portion and a Y-shaped rail portion, said Y-shaped rail portion comprising, two bar plate rails, a reduced end, a pair of bottom bars secured on said two bar plate rails, said pair of bottom bars extending horizontally and diagonally toward the track center, a top bar securing the opposite diagonal bottom bars, ribs on top of said diagonal bottom bars coöperating with said two bar plate rails, an apertured bar on the bottom of said two bar plate rails, a transverse bar 32 carrying stands, said transverse bar 32 coöperating with said top bar and said apertured bar, said stands coöperating with said brace rods and said central rail, bifurcated branches at one end of said two bar plate rails longitudinal slots in each of said bifurcated branches, a transverse joining bar 10 having spatula extremities engaging said slotted members, said transverse joining bar 10 comprising a semi-circular ring member 22 secured to the center of said transverse joining bar, the top of said semi-circular ring pivotally secured to said central rail bar, a double bar 12 and 9 at each extremity of said transverse joining bar.

9. A triple rail endless track composed of sections flexibly connected with one another, each of said sections including, a central rail bar provided with horizontal branches at one of its ends, a transverse supporting bar secured at right angles on said central rail bar by means of said horizontal branches, a horizontal pivot 19 between said branches, oblique brace rods for said bars, side-rails, one on each side of said central rail bar, said side-rails comprising a Y-shaped rail portion and a sliding rail portion, said Y-shaped rail portion comprising, two bar plate rails, a reduced end, a pair of diagonal bottom bars secured on the inside of said two bar plate rails, assembled in pairs, a top bar, an apertured bar, a transverse bar 32 carrying stands engaging said top bar and said apertured bar, said stands engaging said central rail bar, and said brace rods, bifurcated branches at one end of said two bar plate rails, longitudinal slots in each of said bifurcated branches, a transverse joining bar 10 engaging said slotted members, said transverse joining bar 10 comprising, a semi-circular ring member 22 secured to the center of said transverse joining bar, the top of said semi-circular ring pivotally secured to said central rail bar, a double bar 12 and 9 at each extremity of said transverse joining bar, one end of said sliding rail provided with horizontal branches 35, said branches 35 of said sliding rail being mounted pivotally on one of said double bars, the reduced ends of said Y-shaped rails projecting between the branches of said sliding rail, the reduced end of said Y-shaped rails being secured pivotally on one of said double bars, supporting foot member at the ends of said transverse supporting bar, said transverse supporting extremities secured transversely to the bifurcated branches of said Y-shaped rails, the free end of said central rail bar of the next section mounted pivotally on said central and horizontal pivot 19, substantially as shown and described.

In testimony whereof I affix my signature in presence of two witnesses.

PHILIPPE MONTSABRÉ.

Witnesses:
 MINNIE P. DUMAS,
 DAVID J. YORK.